United States Patent [19]
Bellotti

[11] Patent Number: 4,743,044
[45] Date of Patent: May 10, 1988

[54] DUAL AXLE STABILIZING DEVICE

[75] Inventor: Orfeo J. Bellotti, Rohnert Park, Calif.

[73] Assignee: Bellotti Patent Registration Company, Santa Rosa, Calif.

[21] Appl. No.: 5,614

[22] Filed: Jan. 21, 1987

[51] Int. Cl.$^4$ .................................................. B60G 5/00
[52] U.S. Cl. .................................. 280/680; 280/686; 280/718
[58] Field of Search ............... 280/676, 680, 686, 718, 280/720

[56] References Cited

U.S. PATENT DOCUMENTS

| | | | |
|---|---|---|---|
| 2,194,199 | 3/1940 | Ash | 280/686 |
| 2,784,980 | 3/1957 | Norrie | 241/239 |
| 2,810,587 | 10/1957 | Boughner | 280/680 |
| 2,838,321 | 6/1958 | Gouirand | 280/683 |
| 3,002,762 | 10/1961 | Scheel | 173/99 |
| 3,198,542 | 8/1965 | Harbers | 280/682 |
| 3,199,892 | 8/1965 | Boys | 280/683 |
| 3,261,622 | 7/1966 | Hutchens | 280/680 |
| 3,367,677 | 2/1968 | Preddy, Jr. | 280/680 |
| 3,817,550 | 6/1974 | Young | 280/680 |

FOREIGN PATENT DOCUMENTS

| | | | |
|---|---|---|---|
| 254939 | 5/1963 | Australia | 280/680 |
| 933 | 1/1966 | Australia | 280/680 |

Primary Examiner—Kenneth R. Rice
Attorney, Agent, or Firm—Malcolm B. Wittenberg

[57] ABSTRACT

A vehicle suspension system of the type having a load-bearing axial support. The suspension system is provided with leaf-springs coupling the support to wheel axles of the vehicle such that in normal operation the suspension means are pivotable about the support. Radius rods are pivotally coupled between the wheel axles and a leaf-spring member located above the load-bearing axial support which, in combination, resists the pivoting of the wheel axles about the load-bearing axial support.

4 Claims, 1 Drawing Sheet

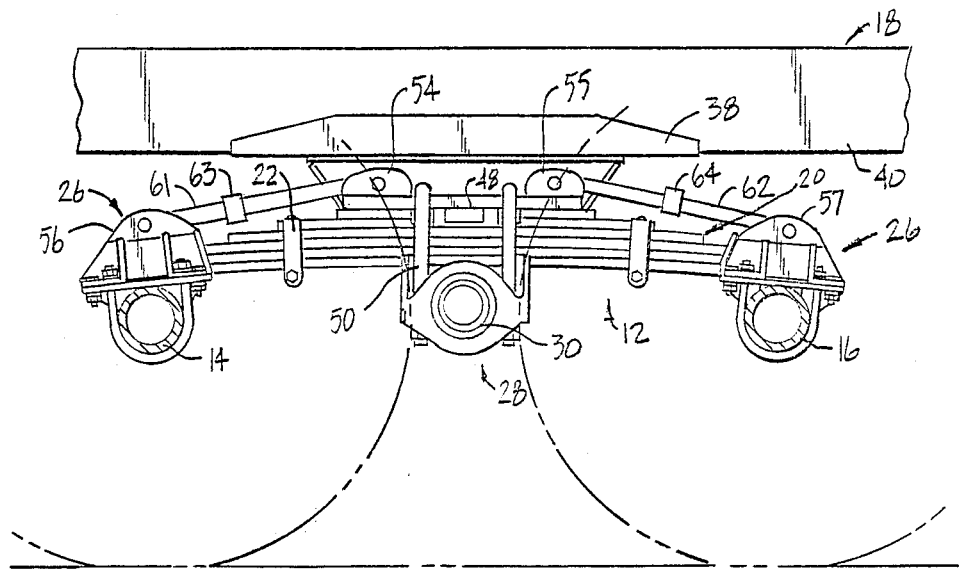
FIGURE

DUAL AXLE STABILIZING DEVICE

TECHNICAL FIELD OF THE INVENTION

The present invention relates to suspension systems for vehicles such as the trailer portions of semi-tractor trailer rigs. The invention is intended to improve upon suspension systems which employ leaf-springs coupling the wheel axles to a centrally located axial load-bearing support to prevent free rotation of the suspension system about said axial support.

BACKGROUND OF THE INVENTION

In certain vehicle suspension systems for mounting the frame or beds of the vehicle on wheels, it is common practice to provide a load-bearing axial support secured to the vehicle and to provide a yieldable connection between this centrally-located support and the suspension system. Most commonly, the suspension system comprises one or more sets of leaf-spring members which pivot about the load-bearing support and whose extremities terminate at the wheel axles. In fact, the prior art has recognized certain advantages in providing for such pivotal motion. For example, U.S. Pat. No. 3,018,143 discloses and claims a bearing construction for a vehicle suspension which permits relatively free movement of the suspension system around the centrally-located load-bearing axle. A similar disclosure is made in U.S. Pat. No. 2,481,891, which teaches the use of a yieldable bushing member, such as rubber, compressed about the load-bearing shaft.

It has now been found, however, that pivotal movement about the centrally located load bearing axial support can have devastating effects upon the roadway upon which the vehicle travels. Semi-tractor trailer rigs are designed to carry impressive loads which are obviously supported by the rig's wheel axles and suspension systems. It has been found that the pivoting action which at one time was thought to be so desirable actually causes the axle-suspension assembly to bounce upon the roadway surface due to surface undulations which cause the wheel axle members to pivot about the centrally-located load-bearing axle. This bouncing effect is not only uncomfortable to the driver and possible harmful to the load being carried by the semi-tractor trailer rig, it also causes the entire weight of the rig to concentrate itself upon one wheel axle and then another, which in turn acts to break up a roadway's surface and significantly reduce its projected life.

It is thus an object of the present invention to provide a vehicle suspension system which includes a centrally-located load-bearing axial support which resists pivotal movement by the wheel axle members across said support.

It is yet a further object of the present invention to provide a method of converting currently-available and used vehicle suspension systems which include a load-bearing centrally-located axial support to a suspension system in which the wheel axles do not significantly pivot about said support.

These and further objects will be more readily visualized when considering the following disclosure and appended drawing wherein The FIGURE is a side elevational view of a suspension system according to the present invention.

Summary of the Invention

The present invention involves a vehicle suspension system of the type having a load-bearing axial support secured to the body of the vehicle such as the rig of a semi-tractor trailer. Suspension means are provided in the form of leaf-springs coupling the support to wheel axles located on either side of the load-bearing axial support. In normal operation, the suspension means are pivotable about the support.

In accomplishing the goal of substantially eliminating the pivoting of the wheel axles about the load-bearing axial support, radius rod members are pivotally coupled between the wheel axles and a leaf-spring member located above the load-bearing axial support. The leaf-spring member is provided to be of sufficient thickness to resist significant flexure upon movement of the wheel axles conveyed through the radius rods.

DETAILED DESCRIPTION OF THE INVENTION

Referring to the appended drawing, there is illustrated a suspension system 12 for trailers, tractors and the like. Generally, a suspension system is used on each side of the trailer or tractor. For purposes of simplicity, only one such suspension system is shown.

The suspension system 12 couples a pair of axles 14 and 16 to a trailer bed generally designated by numeral 18 through a load-bearing axial support 30. Each of the axles is adapted to have mounted thereon in conventional fashion wheels as shown in the phantom lines in the FIGURE.

The suspension system comprises a spring assembly 20 comprising a plurality of conventional spring-leaves held in operative relationship by brackets 22. Axle connections 26 are provided on each end of the spring assembly 20 to couple the spring assembly to the axles in a well-known manner. The centrally-located load-bearing axial support assembly 28 is secured to a central portion of the spring assembly 20 for coupling the spring assembly 20 to axle 30. This can be done with any well-known means, such as U-bolts 50. A free bracket 36 is welded to a clamp member holding the centrally-located load-bearing axle 30 (not shown) and a frame flange 38 is secured to the top of the frame bracket 36 and to a longitudinal frame support 40 of the trailer bed 18. The structure generally described above is well-known in the art of suspension systems.

The components described above with reference to the appended FIGURE tend to encourage wheel axle members 14 and 16 to freely pivot about centrally-located load-bearing axial member 30. To prevent this unwanted pivoting motion, pre-existing vehicle suspension assemblies can be modified inexpensively and conveniently in the following manner. Leaf-spring member 48 is applied directly above load-bearing axial assembly 28 and held in position by U-bolt members 50. Leaf-spring member 48 can comprise any suitable member having sufficient rigidity to resist flexure when acted upon by forces to be described hereinafter. Ideally, leaf-spring member 48 can comprise a steel plate having a thickness of approximately one inch or greater.

Provided above each axial connection 26 are pivotal anchors 56 and 57. Also located at the extremities of leaf-spring 48 are yet another complementary pair of pivotal anchors 54 and 55. These pivotal anchors can each be welded to the surface on which they reside.

Radius rods 61 and 62 are pivotally held in position by pivotal anchors 54, 55, 56 and 57. Further, the radius rods can be caused to adjust by adjustment bolts 63 and 64 to "fine tune" the present system for various on-site applications. In practice, the radius rod can comprise any well-known connection means, such as torsion bars, hydraulic rams and air rams.

In operation, undulations in a roadway surface cause axles 14 and 16 to move vertically. The vertical movement acts to compress radius rods 61 and 62 which in turn acts to flex leaf-spring member 48. In view of the fact that leaf-spring member 48 is securely fastened about centrally-located load-bearing axle assembly 28, pivot about said assembly is substantially eliminated while the shock-absorbing effect of the suspension system, generally, is not significantly diminished.

It is significant to note that pre-existing vehicle suspension systems can be modified to the present invention by the rather straightforward and simple steps of attaching leaf-spring member 48 with U-bolts 50 above centrally-located axle assembly 28 and four pivotally mounted anchor assemblies 54, 55, 56 and 57, including radius rods 61 and 62.

The invention in its broader aspects is not limited to the specific mechanism shown and described, but departures may be made therefrom within the scope of the accompanying claims without departing from the principles of the invention and without sacrificing its chief advantages.

I claim:

1. In a vehicle suspension system of the type having a load-bearing axial support including means for securing said support to said vehicle and suspension means in the form of leaf-springs coupling said support to wheel axles of said vehicles such that in normal operation said suspension means are pivotable about said support, the improvement in said vehicle suspension system comprising
radius rod members each pivotally coupled between said wheel axles and a leaf-spring member located above said load-bearing axial support, said leaf-spring member comprising a steel plate having a thickness of approximately one inch or greater to resist significant flexure upon movement of said wheel axles conveyed through said radius rods, the combination of said radius rods and leaf-spring member being sufficient to substantially resist the pivoting of said wheel axles about said load-bearing axial support.

2. The vehicle suspension system of claim 1 wherein said leaf-spring member is held in position above said load-bearing axial support by U-bolts connected to said load-bearing axial support.

3. A method for improving a vehicle suspension system which comprises a load-bearing axial support including means for securing said support to said vehicle and suspension means in the form of leaf-springs coupling said support to wheel axles of said vehicle such that in normal operation said suspension means are pivotable about said support, the method comprising pivotally attaching radius rod members between said wheel axles and a leaf-spring member which itself is attached above said load-bearing axial support, said leaf-spring member comprising a steel plate having a thickness of approximately one inch or greater to resist significant flexure upon movement of said wheel axles conveyed through said radius rods, the combination of said radius rods and leaf-spring members being sufficient to substantially resist pivoting of said wheel axles about said load-bearing axial support.

4. The method of claim 3 wherein said leaf-spring member is held in position above said load-bearing axial support by U-bolts connected to said load-bearing axial support.

* * * * *